Aug. 23, 1938.  C. R. HANNA  2,128,045
CONTROL SYSTEM
Filed Feb. 5, 1937  3 Sheets-Sheet 1
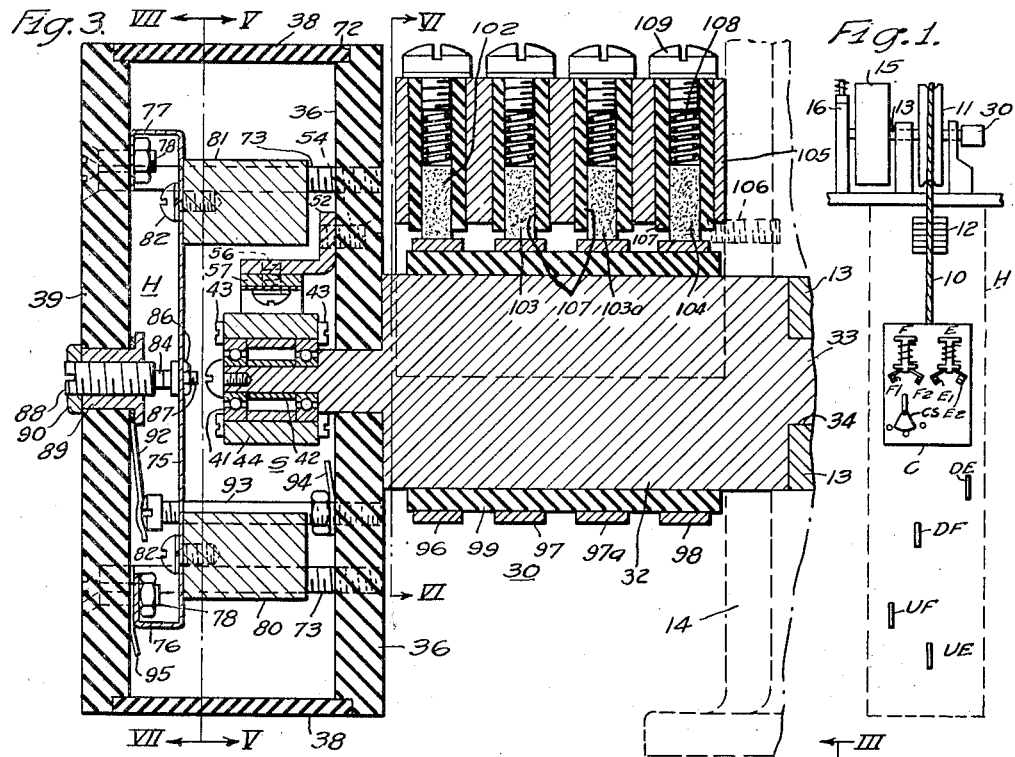
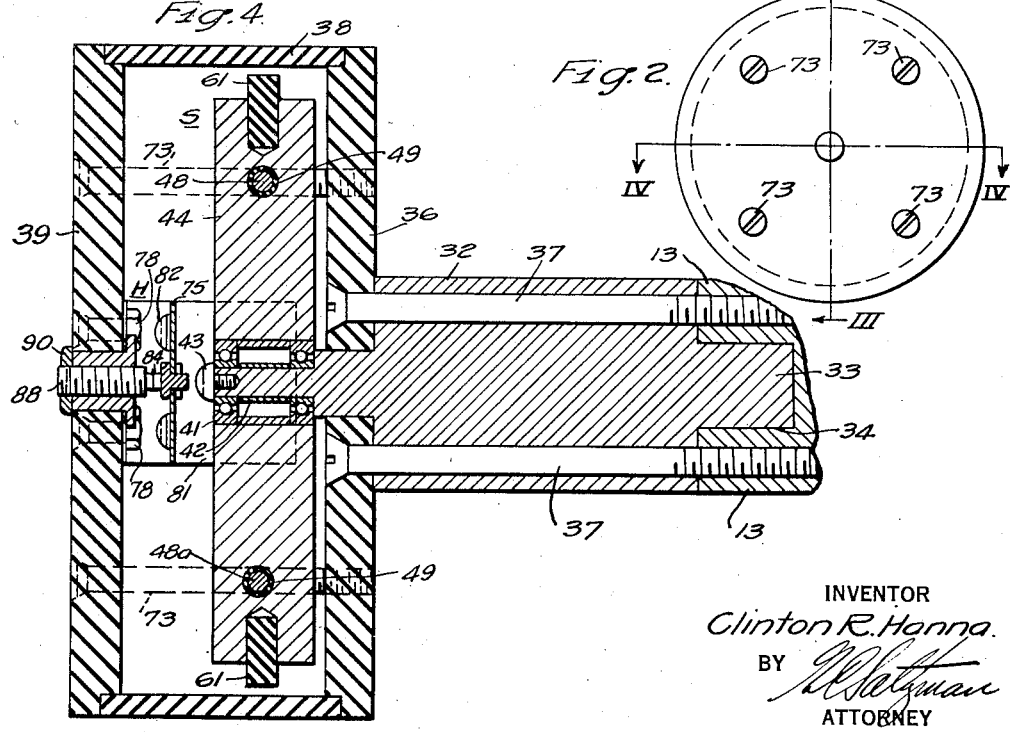
INVENTOR
Clinton R. Hanna.
BY
ATTORNEY Aug. 23, 1938.                C. R. HANNA                2,128,045
                              CONTROL SYSTEM
                          Filed Feb. 5, 1937            3 Sheets-Sheet 2
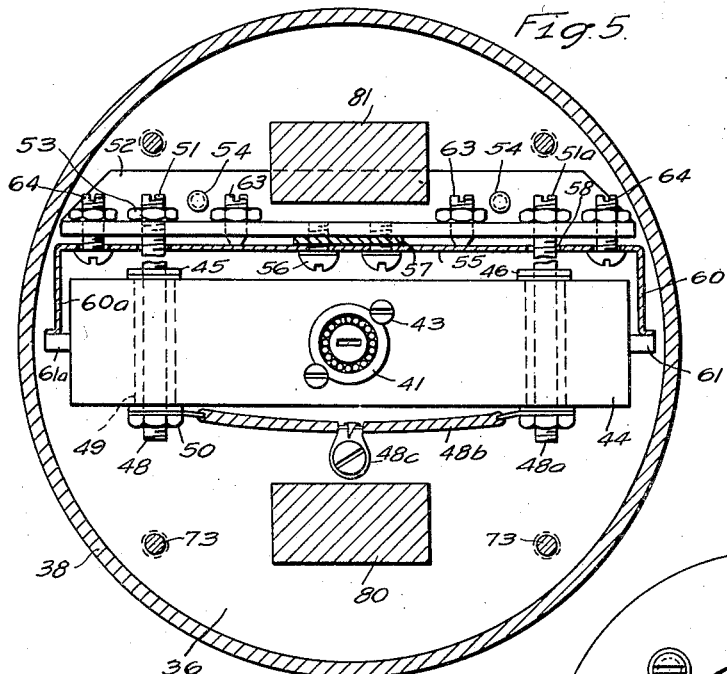
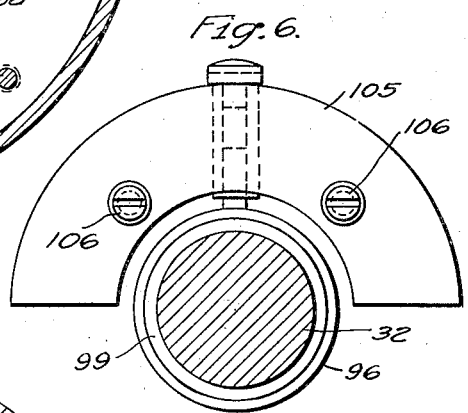
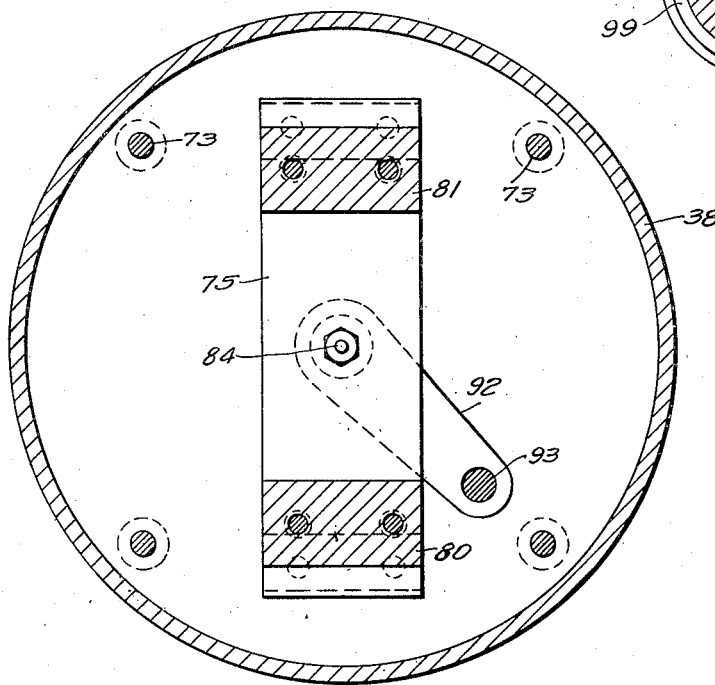
INVENTOR
Clinton R. Hanna.
BY
ATTORNEY Aug. 23, 1938.  C. R. HANNA  2,128,045
CONTROL SYSTEM
Filed Feb. 5, 1937   3 Sheets-Sheet 3
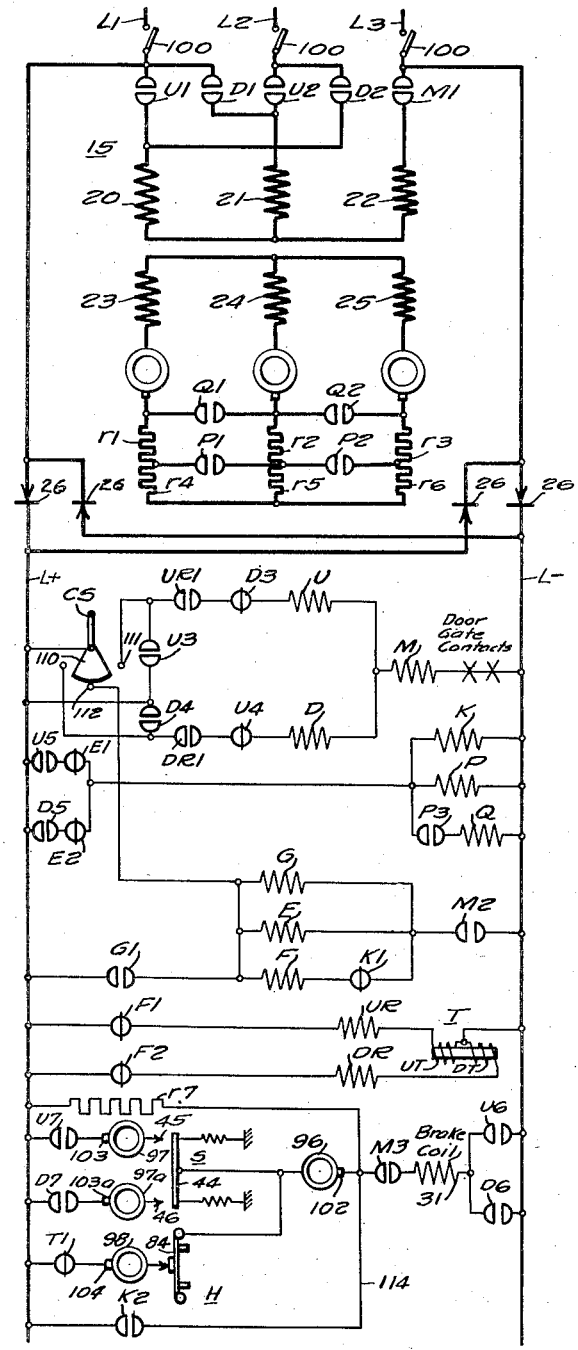
Fig. 8.
WITNESSES:
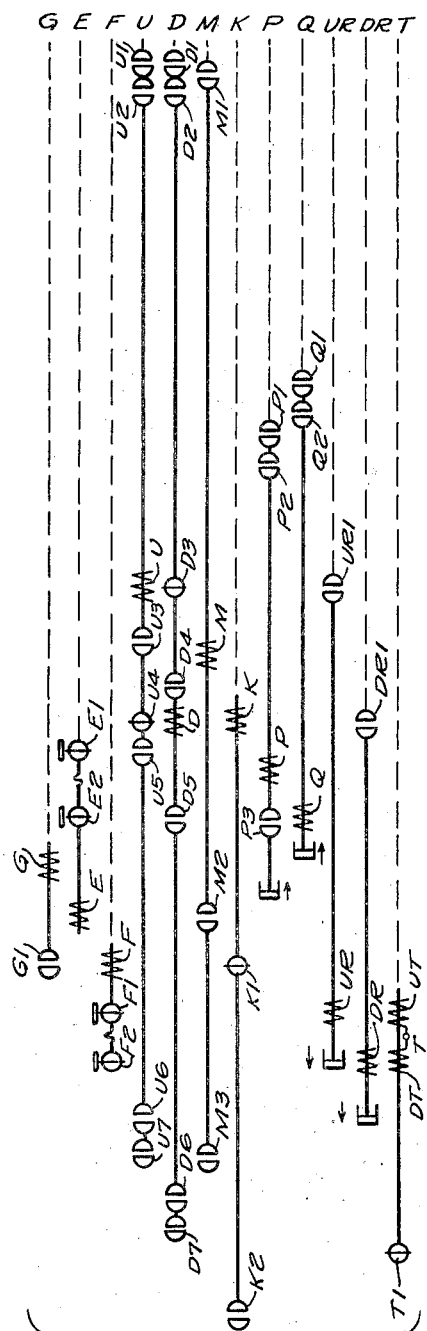
Fig. 8A.
INVENTOR
Clinton R. Hanna.
BY 
ATTORNEY Patented Aug. 23, 1938

2,128,045

UNITED STATES PATENT OFFICE 2,128,045

CONTROL SYSTEM

Clinton R. Hanna, Pittsburgh, Pa., assignor to Westinghouse Electric & Manufacturing Company, East Pittsburgh, Pa., a corporation of Pennsylvania Application February 5, 1937, Serial No. 124,258

12 Claims. (Cl. 187—29)

My invention relates to control systems for electric elevators, and more particularly to control systems for low speed or moderate speed elevators.

One object of my invention is to provide a control system which will automatically decelerate and stop a car exactly at a predetermined time after retardation is started and to so control that deceleration stop that that total time will be shorter than in previous systems and the stop will be effected more quickly and accurately; that is, to secure an ideal rate of slowdown and at the same time retain a high degree of accuracy in stopping. This is desirable because, in previous systems with which I am acquainted, accuracy in stopping has been sacrificed for a uniform and desirable rate of deceleration and slowdown of the car or good deceleration and slowdown has been sacrificed for accuracy in stopping level with the floor.

Another object of my invention is to provide a control system which will automatically control the rates of acceleration and deceleration of the car to secure the most desirable operation of the car.

A further object is to provide for maintaining a uniform rate of retardation of the car when it is being decelerated from its normal running speed to a stop at a floor regardless of load and other conditions of operation.

Another object of my invention is to provide a control system in which the elevator car may be stopped accurately level with the floor at which a stop is to be made.

For a better understanding of the invention reference may be had to the accompanying drawings, in which:

Figure 1 is a diagrammatic illustration of an elevator system embodying my invention;

Fig. 2 is an enlarged view, in end elevation, of the deceleration controller mounted on the outer end of the shaft of the hoisting drum in the system shown in Fig. 1;

Fig. 3 is an enlarged view in cross-section, taken on the line III—III of Fig. 2, illustrating the interior construction of the controller;

Fig. 4 is an enlarged view in cross-section taken along the line IV—IV of Fig. 2 and illustrating the interior construction of the controller at right angles to that shown in Fig. 3;

Fig. 5 is a view in cross-section taken on the line V—V of Fig. 3 for the purpose of illustrating the inertia governor embodied in my invention;

Fig. 6 is a view taken on the line VI—VI of Fig. 3 illustrating the contact rings and brushes on the controller for electrically connecting it to the control system illustrated in Fig. 1;

Fig. 7 is a view, taken on the line VII—VII of Fig. 3, illustrating the centrifugal governor embodied in the controller illustrated in Fig. 1;

Fig. 8 is a diagrammatic representation of the electrical circuits for the elevator system illustrated in Fig. 1, these circuits being drawn in what is known as the "straight line" style; and Fig. 8A is a representation of the relays embodied in Fig. 8 with their coils and contact members disposed in horizontal alignment with their positions in the "straight-line" circuits of Fig. 8, so that the reader may readily determine the identity of any relay, the number and kind of its contact members, and the position of its coil and its contact members in the straight-line circuits. The relays are named as follows:

U=up direction relay.
D=down direction relay.
P=intermediate speed time delay relay.
Q=high speed time delay relay.
E=high speed decelerating inductor relay.
F=intermediate speed decelerating inductor relay.
G=relay for holding inductor relay circuits.
M=inductor restoring relay.
UR=up stopping relay.
DR=down stopping relay.
K=interlocking control relay.
H=centrifugal switch.
S=inertia switch.
T=deceleration control relay.

Referring more particularly to the drawings, I have illustrated an elevator system comprising a car C disposed in an elevator hatchway HA by a cable 10 passing over a hoisting drum 11 to a suitable counterweight 12. The hoisting drum is mounted on a shaft 13 rotatably supported in a plurality of bearings 14 and operated by a hoisting motor 15. An electromagnetic brake 16 is provided for controlling the speed of the motor and the hoisting drum.

The hoisting drum may be operated by any suitable motor, the one here illustrated being a three-phase alternating-current motor provided with primary windings 20, 21 and 22 and secondary windings 23, 24 and 25.

The motor may be connected for operation to a source of electrical energy by a supply circuit represented by the conductors L1, L2 and L3. These conductors may also provide energy to a control circuit for the motor represented by the conductors L+ and L— through a plurality of copper oxide rectifiers 26.

A car switch CS is mounted in the car for operation by a car attendant in starting and stopping the car. The car switch is moved in a clockwise direction to start the car downwardly in a counter-clockwise direction to start the car upwardly; and to the center position to stop the car at the next floor.

An up direction relay U and a down direction relay D are controlled by the operation of the car switch for connecting and disconnecting the motor to its source of electrical energy in operating the car in either the up or the down direction.

An intermediate speed time delay relay P and a highspeed time delay relay Q are provided for controlling the speed of the motor 15 through connecting and disconnecting a plurality of resistors r1 to r6, inclusive, in response to the operation of the direction relays U and D.

In the system shown, the centering of the car switch causes the car to decelerate and stop only at the floors because the elevator is provided with an automatic stopping means which is effective only for the floors; that is, the car switch may be centered for a stop any time after passing a floor until within a predetermined distance of the floor at which a stop is to be made and then the automatic stopping means will take up the operation at a predetermined point and cause the car to decelerate and stop exactly at the floor.

Any suitable automatic stopping means may be employed. As an example, I have illustrated an automatic inductor landing system similar to that disclosed in the White and Hearn Patent No. 1,884,446, issued October 25, 1932, and assigned to the Westinghouse Electric Elevator Company.

The inductor landing system includes a highspeed decelerating inductor relay E for initiating deceleration of the car while it is running at high speed, a second decelerating inductor relay F for causing the car to be automatically decelerated from its intermediate speed down to its stopping speed, and an up stopping relay UR and a down stopping relay DR for bringing the car to rest after it has been decelerated to stopping speed.

The decelerating inductor relay E is mounted on the car in position to cooperate with an inductor plate UE for the up direction and an inductor plate DE for the down direction. The intermediate relay F is mounted on the car in position to cooperate with an inductor plate UF for the up direction and an inductor plate DF for the down direction. The inductor plates are mounted in the hatchway in position to be passed by the relays on the car as the car moves up and down the hatchway. A set of inductor plates is provided for each floor.

As shown, each inductor relay is provided with two sets of contact members which are so connected with the car control circuits that, when the inductor relays are energized by centering the car switch to effect deceleration and stopping of the car in the up direction, the contact members E1 as they pass the next up inductor plate UE are opened to decelerate the car, and as the contact members E1 come opposite the next inductor plate UF, they are opened to further control the deceleration of the car and deenergize the stopping relay UR. The deenergized relay UR is provided with time delay means whereby it operates to stop the car level with the floor a predetermined time after the relay F operates.

The down direction contact members on the inductor relays and the down direction stopping relay DR operate in the same manner for the down direction.

A locking relay G is provided for maintaining the inductor relay in their energized condition during the decelerating and stopping operation. An inductor restoring relay M is provided for releasing the inductor relays from the control of the locking relay G and to prevent the inductor relays from being again energized until the car is moving and a new stop is to be made.

An interlocking control relay K is provided for energizing the inductor relay subsequent and in response to operation of the inductor relay E in passing its cooperating plate and for controlling certain other features in connection with the deceleration of the car.

In prior elevator installations of the type illustrated with which the applicant is acquainted, the ideal rate of deceleration of the car has been sacrificed for accuracy in stopping it level with the floor, or accuracy in stopping has been sacrificed for the sake of good deceleration and slowdown to the stopping point. Therefore, I have provided means for so controlling the deceleration and stopping of an elevator car that its operation will be as smooth and rapid as possible for the speed for which it is designed and at the same time its accuracy in stopping level with the floor will be improved.

In practicing my invention, I have provided a control means including a deceleration controller 30 mounted upon the outer end of the shaft 13 of the hoisting drum 11, a deceleration control relay T and connections with the control circuit for so controlling the coil 31 of the brake 16 as to effect the desired deceleration and stopping of the car.

The controller 30 includes an inertia switch S and a centrifugal switch H and is disposed to rotate with the shaft 13 upon which it is mounted. The controller is mounted on the shaft 13 by means of a stub shaft 32 (Figs. 3 and 4), the right end of which has a central projection 33 which extends into an aperture 34 (Fig. 4) in the shaft for the purpose of providing a firm connection therewith. A circular base plate 36 is mounted upon the outer end of the stub shaft 32. A pair of screw bolts 37 pass through the plate and the stub shaft and into the end of the shaft 13 for the purpose of holding the plate and the stub shaft firmly in position on the shaft so that they will rotate therewith. A cylinder 38 is mounted on the base plate and is retained in position thereon by a face plate 39. The face plate is constructed of insulating material and is held in position by a plurality of screw bolts 73 so that the base plate, the cylinder and the face plate constitute a casing for the controller.

The inertia switch S is mounted in the controller 30 and comprises a heavy bar 44 and two pairs of cooperating contact members 45 and 46. The bar 44 is rotatably mounted, by means of ball bearings 41 on a stub shaft or axle 42 extending through the base plate from the stub shaft. A plurality of screws 43 hold the bearings and the bar in correct position on the shaft. One of the contact members 45 is mounted upon one end of the bar 44 by means of a screw threaded stud 48 which passes through the bar and is insulated therefrom by an insulating sleeve 49. A nut 50 is disposed on the screw threaded stud 48 in position to fasten the contact member 45 firmly on the bar 44. The other contact member 45 is mounted on a screw threaded stud 51 disposed in a supporting plate 52 and firmly secured therein by means of a lock nut 53. The plate 52 is firmly affixed to the supporting plate 36 by means of a pair of screw bolts 54. The contact members 46 are mounted at the other end of the bar in the same manner.

A spring 55 is provided for biasing the bar 44 against closing either pair of contact members 45 or 46. The spring is firmly secured at its central portion to the plate 52 by a pair of machine screws 56 and a plate 57. The outer portions of the spring 55 are provided with a pair of holes 58 concentric with the axis of the screw threaded studs 51 and 51a so as to permit the outer ends of the spring to move without touching the contact studs. The outer ends 60 and 60a of the spring are bent at right angles to its body portion to extend toward the outer ends of the bar 44 and into engagement with a pair of stud members 61 and 61a in the outer ends of the bar for the purpose of biasing the bar to keep open the contact members 45 and 46. A pair of set screws 63 are mounted in the supporting plate 52 in position to adjust the position of the outer ends of the spring, relative to the plate 52 and a pair of limiting screws 64 are likewise mounted in the supporting plate 52 for the purpose of limiting the movement of the outer ends of the spring away from the plate. By operating those adjusting screws, the spring may be set to so control the operation of the bar as to cause it to close one of its contact members when the rate of deceleration exceeds a predetermined rate. The contact members 45 are for up direction operation and the contact members 46 for down direction.

Inasmuch as the heavy bar 44 is mounted on ball bearings, as shown in Fig. 5, it is free to move relative to the shaft 32 except for the biasing action of the spring 55. By reason of the biasing action, the bar will rotate with the stud shaft 32 unless the rate of deceleration or acceleration is greater than the predetermined rate for which the spring has been set by the adjusting screws 63 and 64. When the controller is rotated in a clockwise direction (Fig. 5) during deceleration to an up stop and the rate of deceleration is greater than that for which the adjusting screws have been set, the inertia of the heavy bar 44 will overcome the resistance of the outer end 60a of the spring 55 sufficiently to close the contact members 45. When the hoisting drum is decelerated during a down stop at a rate greater than that for which the set screws 63 and 64 have been adjusted, the inertia of the bar 44 will cause the contact members 46 to close.

The centrifugal switch H is mounted upon the inner side of the face plate 39 and comprises a resilient strip or flat spring 75 having its outer ends 76 and 77 bent to the left and inwardly to a position where they may be secured to the inner surface of the face plate 39 by means of a pair of bolts 78. A pair of weight members 80 and 81 are secured to the outer portions of the strip 75 by means of a pair of screws 82 for the purpose of causing the resilient strip 75 to respond to a predetermined degree of centrifugal force, when the controller is rotated by the operation of the car. The strip 75 controls a pair of contact members 84, one of which is mounted by means of a lock nut 86 and a screw threaded stud 87 in the center of the strip and the other of which is mounted by means of a screw threaded stud 88 in the face plate 39. A collar 89 and a lock nut 90 are provided for holding the screw threaded stud 88 in the center of the face plate. By releasing the lock nut and rotating the stud, the contact members 84 may be adjusted to control the point at which centrifugal force will effect the opening of these contact members. By reason of the mounting of the resilient strip 75, it will be seen that, when the speed of the controller in either direction exceeds the rate for which the centrifugal switch is adjusted, the centrifugal force on the weights 80 and 81 will cause them to move outwardly from the center of the controller and in so doing to cause the contact members 84 to separate.

Hence, it will be seen now that the controller embodies an inertia switch S, which closes one of its contact members when the deceleration of the car exceeds a predetermined rate, and that it embodies a centrifugal switch H which opens its contact members when the car operates above a predetermined speed.

The contact member 84 mounted on the stud 88 is provided with an electrical connection comprising a contact member 92, one end of which is mounted underneath the shoulder on the collar 89 and the other end of which extends into position to engage the outer end of a bolt 93, the lower end of which is mounted in the base plate 36 and is provided with a contact member 94. The other contact member 84 mounted on the stud 87 may be electrically connected as desired through the strip 75 and a contact member 95 disposed underneath the end 76 of the strip. The ends of the contact members 45 and 46 mounted in the bar 44 are provided with electrical connections comprising a flexible conductor 46b leading to a connecting post 46c on the base plate 36. The connecting posts 51 and 51a provide a means whereby the other ends of the contact members 45 and 46 may be electrically connected in a circuit.

In order that the contact members in the controller may be electrically connected to the elevator control system, the controller is provided with four slip-rings 96, 97, 97a and 98. The slip-rings are mounted upon an insulating sleeve 99 on the stub shaft 32 to rotate with the shaft. The slip-ring 96 may be electrically connected through the connectors 46c and 95 to one side of the contact members 84, 45 and 46, the slip-rings 97 and 97a, respectively, to the other side of the contact members 45 and 46 through the studs 51 and 51a, and the slip-ring 98 to the other side of the contact members 84 through connector 94, bolt 93, and connector 92. A plurality of stationary brushes 102, 103, 103a and 104 are mounted in a brushholder 105 to engage the rotating rings. The brushholder is firmly secured to the outer side of the bearing 14 by means of a pair of screws 106 (Figs. 3 and 6). Each brush is mounted in an insulating sleeve 107 and is pressed against its cooperating slip-ring by means of a spring 108 and a screw threaded bolt 109. The brushes are electrically connected in the control system, so that the contact members 45 and 46 and 84 may control the energization of the brake coil 31 as shown in Fig. 8. The circuits through the contact members 45 and 46 are controlled by contact members U7 and D7 on the direction relays so that contact members 45 respond only in up direction operation and contact members 46 only in down direction operation (Fig. 8).

The circuit of the coil 31 is also provided with a resistor r1 for cooperation with these contact members in controlling the energization of the coil. The circuits through the contact members 45 and 46 are so controlled by the contact members U7 and D7 that the contact members are effective only for the up direction and the contact members 46 for the down direction operation of the car.

The control system is also provided with a deceleration control relay T associated with the car control system in such manner as to control the connection through the slip-ring 98 during the operation of the controller 30. The contact members K2 of the relay K are also connected in the control circuit for the brake coil 31 in such a manner as to assist in controlling the deceleration of the car.

It is believed that the invention may be best understood by an assumed operation of the apparatus herein described. It will be assumed that the system is designed for operating the car at a normal speed of approximately 320 feet per minute, and that the first stage of deceleration of the car when making an intended stop will bring it down from 320 feet per minute to approximately 60 feet per minute, that the second stage of deceleration will bring the car down approximately to rest. It will also be assumed that the inertia switch S is set to close at a predetermined rate of deceleration of, say 5 feet per second per second.

It will also be assumed that the contact members 84 of the centrifugal switch H are adjusted to open when the car exceeds a speed of 60 feet per minute and close when the car operates below 60 feet per minute.

In preparing the system for operation, the switches 100 are closed for connecting the motor circuit to the supply conductors L1, L2 and L3 and energizing the control supply conductors L+ and L—. The energization of conductors L+ and L— energizes the up direction stopping relay UR and the down direction stopping relay DR to close their contact members UR1 and DR1, to prepare the system for operation in either the up or the down direction.

Assuming that the car is standing at a floor and that the attendant thereon operates the car switch CS in a counter-clockwise direction to cause the car to move upwardly, the operation of the switch closes its contact members 110 and 111, thereby energizing the up direction relay U and the inductor restoring relay M, the circuit extending from the supply conductor L+ through the car switch, 110, 111, UR1, D3, U, M, XX, to L—.

The energization of the relay U closes its contact members U1, U2, U3, U5, U6, U7 and opens its contact members U4. The closing of the contact members U1 and U2 and M1 connect the windings of the motor 15 to the supply conductors L1, L2 and L3. The closing of the contact members U3 provide a self-holding circuit for the up direction switch which causes it to remain in operation until the automatic inductor relay stopping means operates to effect the stopping of the car.

The closing of the contact members U6 of the energized relay U and the contacts M3 of the energized relay M releases the brake 16 by energizing the brake coil 31 through a circuit extending from the supply conductor L+ through T1, 104, 98, 84, 96, 102, M3, 31 and U6, to L—. The brake is now released and the car starts on its trip.

The closing of the contact members U5 energizes the intermediate speed relay P which closes its contact members P1 and P2 with a time delay and thereby short circuits the resistors r4, r5 and r6 in the secondary windings of the motor 15. This causes the motor to increase its speed. The energized relay P also closes its contact members P3, thereby energizing the high-speed relay Q to close its contact members Q1 and Q2, also with a time delay, thus short circuiting the resistors r1, r2 and r3 in the secondary windings of the motor 15 and causing the motor to now operate the car at its normal high speed.

The car is now operating upwardly at normal high speed and it will be assumed that the car attendant decides to stop the car at the next floor. To do this he centers the car switch CS to render effective the automatic decelerating and stopping means for stopping the car level with the next floor. The centering of the car switch closes its contact members 110 and 112 and thereby energizes the decelerating inductor relay E and the inductor maintaining relay G. The energized relay G closes its contact members G1 and thereby maintains the inductor relay system in operation until the stopping of the car is completed.

The inductor relay E is now energized and as the car continues its upward movement it approaches the up inductor plate UE for the floor at which the stop is to be made. As the energized relay comes opposite the plate, it is operated to open its contact members E1, thereby deenergizing the relays, the interlocking relay K and the speed relays P and Q.

The deenergized speed relays open their contact members P1 and P2 and Q1 and Q2 at once and thereby reinsert the resistors r1 to r6 in the secondary windings of the motor 15, thus reducing the speed of the hoisting motor to decelerate the car.

The opening of the contact members K2 brings into operation my improved decelerating means by opening the main circuit 114 for the brake coil and thereby throwing into effect the parallel or auxiliary circuits for the brake coil, one of which extends through the resistor r7, another of which extends through the contact members of the inertia switch S, and another of which extends through the contact members of the centrifugal switch H. Inasmuch as the car at the start of its deceleration is not being retarded, the inertia switch contact members are open, and inasmuch as the car is operating at a speed above 60 feet per minute, the contact members 84 of the centrifugal switch H are open. Therefore, the circuit for the brake coil 31 extends through the resistor r7 which partially deenergizes the brake coil to partially apply the brake 16 so that the brake now assists in decelerating the car.

Assuming that the deceleration is at a rate greater than the desired predetermined rate for which the inertia switch S is adjusted, that excessive deceleration causes the inertia switch by reason of the inertia of the bar 44, to close its contact members 45 and thereby short circuit the resistor r7. The circuit for the brake coil now extends from the supply conductor L+, through contact members U7, brush 103, slip ring 97, contact members 45, slip ring 96, brush 102, contact members M3, brake coil 31, and contact members U6 to supply conductor L—. This applies full voltage to the brake coil and causes it to release the brake some and thereby decrease the rate of deceleration of the car.

The net effect is to cause a rapid change of voltage across the brake coil which because of the inductance of the coil and the inertia of the moving parts of the brake results in a braking torque just sufficient to maintain the desired rate of retardation of the elevator.

Assuming that during this first stage of deceleration the car decelerates to a speed slightly below 60 feet per minute, then the centrifugal switch H closes its contact members 84 and thereby energizes the brake coil 31 by a circuit extending from the supply conductor L+ through T1, 104, 98, 84, 96, 102, M3, 31 and U6 to L—. The energized brake coil releases the brake completely so that the car increases its speed to slightly above 60 feet per minute under the action of the motor. This increase of speed now causes the contact members of switch H to open and reduce the voltage applied to the brake coil. The net effect here is to produce a brake torque just sufficient to maintain a speed of 60 feet per minute. This speed is maintained for a short distance of car travel until further retardation takes place as will be described. The purpose of this short travel at reduced speed is to make up for discrepancies in the high speed from which the retardation started. These discrepancies are caused by variations in load, etc., that affect the full speed of the motor.

It will thus be seen that the car upon passing the first inductor plate after the centering of the car switch, will be decelerated from its normal high speed down to approximately 60 feet per minute, and that this deceleration will be controlled to within a desired predetermined rate by the operation of the inertia switch S and the centrifugal switch H.

Although the inertia switch has been described as opening and closing in a manner which would seem to occur every now and then, it will in actual practice open and close so fast and so often in controlling the deceleration of the car as to almost amount to continuous vibration. In fact if the resistor r7 and its circuit are eliminated, the rapid opening and closing of the contacts of switch S will so control the energy through the brake coil as to cause the brake to effect the desired rate of deceleration. However, in the majority of cases, better results will be obtained if the resistor r7 is retained. Regardless of whether the action of the switches is slow or fast, the net result, as shown by operation, is that they operate in the manner described to control the deceleration of the car within the predetermined limits within which the switches are adjusted to operate.

Assuming now that the car has decelerated to a speed of 60 feet per minute and that it has approached within such a distance of the next floor stop that the inductor relay F comes opposite the up inductor plate UF, and is thereby operated to open its contact members F1.

The opening of the contact members F1 deenergizes the up stopping relay UR to effect the stopping at a predetermined time thereafter. The opening of the contact members F1 also deenergizes the coil UT of the deceleration control relay T and, inasmuch as its coil DT is now unopposed by the coil UT, the relay T is energized to open its contact members T1 in the circuit through the centrifugal switch H. This renders the centrifugal switch H inoperative to affect the further operation of the car while it is retarding from the 60 foot per minute speed, and the car will be further decelerated to approximately zero speed, through the control of the inertia switch S.

Assuming now that the car in its further movement toward the floor at which it is to stop decelerates too rapidly, then the switch S is operated by the inertia of the bar 44 to close its contact members 45 and thereby short circuit the resistor r7, thus fully energizing the brake coil 31 and causing it to fully release the brake 17. This permits the car to decrease its rate of deceleration and the inertia switch bar resumes its normal position and opens its contact members, again reinserting the resistor r7 in the brake coil, cutting down the energization of the brake coil and causing it to only partially apply the brake 16 to slow down the car. Assuming that the car slows down too rapidly, the bar 44 is again moved by its inertia and the rotation of the controller to close its contact members 45 and again short circuit the resistor r7 to again fully energize the brake coil and thus fully release the brake 16 so that the car again speeds up.

The tendency of the elevator system is to cause the car to decelerate somewhat more rapidly than the predetermined desirable rate. Therefore the inertia switch S will keep short circuiting the resistor r7 every little bit to decrease the rate of deceleration of the car in opposition to its rapid rate of deceleration, and thus cause it to decelerate at the desired rate. As stated above, it is found in practice that the inertia switch S operates so often and so rapidly in decelerating the car that it is in almost constant vibration and practically brings the car down to rest at a practically constant rate of deceleration. And, as stated before, if it is desired to change the rate of deceleration that may be done by changing the position of the adjusting screws 63 and 64 (Fig. 5).

The relay UR, as described above, is a time-delay relay. The relay is designed to have such a time delay in operation that it will not operate until a predetermined time after it is deenergized. A fraction of a second only will be required for the car to change its speed from 60 feet per minute as it passes the second inductor plate until it comes approximately to rest. The time and the rate of deceleration being predetermined, the car will arrive at a point, say 2 inches from the floor at the speed of 5 feet per minute. At this point, the time delay relay UR operates to open its contact members UR1 and thereby deenergizes the up direction relay U and the inductor restoring relay M. The deenergized relay U opens its contact members U1 and U2 and the relay M opens its contact members M1, thereby deenergizing the motor 15, causing it to stop the car. The opening of the contact members U6 deenergizes the brake coil 31, and thereby causes the brake 16 to be fully applied to stop and hold the car level with the floor at which the stop is being made.

The deenergized relay M opens its contact members M2 and thereby deenergizes the inductor relay group G, E and F, so that the stopping inductor relays will not be operated until the car is again in motion and the car switch CS is again centered for another stop. The deenergization of the relay F closes its contact members F1 and thereby reenergizes the relay UR and the coil UT. Inasmuch as the coil UT opposes the coil DT, the deceleration control relay is again restored to its deenergized condition and this closes its contact members T1 to restore the circuit to be controlled by the centrifugal switch H. The inductor relays are now restored and ready for further control and the deceleration system is also restored and ready to be again operated when the car is next to be decelerated in making a stop.

From the foregoing description it will be seen that I have provided a system of control in which the car starts deceleration at a predetermined distance from a floor while operating at normal high speed, that this deceleration brings the car down to a speed of approximately 60 feet per minute at the time it comes opposite the second inductor plate at another predetermined distance from the stopping floor, that it decelerates the car at a desired rate of deceleration from approximately 60 feet per minute at the second inductor plate to approximately zero speed when at the floor level, and that the car is then held level with the floor.

It will also be apparent from the foregoing description that the distance during which deceleration takes place is predetermined, that the rate of deceleration is predetermined and, therefore, that the car can be decelerated and stopped automatically level with the floor regardless of load or other conditions of operation. It will also be apparent that accuracy in stopping at the floor need not be sacrificed for the sake of securing a good rate of deceleration and, on the other hand, that a good rate of deceleration need not be sacrificed for the sake of securing accuracy in stopping level with the floor.

It is to be understood that the speeds, rates of deceleration, and distances referred to herein are given as examples but that other speeds, rates of deceleration and distances may be utilized where desirable.

Although I have illustrated and described only one specific embodiment of the invention, it is obvious that many changes therein and modifications thereof may be made without departing from its spirit and scope.

I claim as my invention:

1. In an elevator system for moving a car up or down to a floor, a hoisting motor for the car, means for controlling the motor to operate the car, a brake for controlling deceleration and stopping of the car, a rotatable inertia switch, means for rotating the inertia switch in accordance with the speed of the car, and means responsive to a predetermined rate of deceleration in the rate of rotation of the inertia switch for decreasing the braking effect of the brake to decrease the rate of deceleration of the car.

2. In an elevator system for operating a car serving a floor landing, a hoisting motor for the car, a braking means, a switching means, means responsive to one operation of the switching means for causing the motor to start the car and responsive to another operation of the switching means for causing deceleration of the car to make a stop and for operating the braking means to retard the car, a decelerating control means including a centrifugal device responsive to the speed of the car for reducing the braking effect of the braking means when the speed of the car falls below a predetermined speed and an inertia device responsive to a predetermined rate of deceleration of the car for decreasing the braking effect of the braking means to decrease the rate of deceleration of the car, and means responsive to operation of the switching means to effect deceleration of the car for rendering the centrifugal device and the inertia device effective to control the braking effect of the brake only during deceleration of the car.

3. In an elevator system for operating a car serving a floor landing, a hoisting motor for the car, a braking means, a switching means, means responsive to one operation of the switching means for causing the motor to start the car and responsive to another operation of the switching means for causing deceleration of the car to make a stop and for operating the braking means to retard the car, a deceleration controller including an inertia device and a centrifugal device, means for rotating the controller in accordance with the speed of the car, means responsive to operation of the inertia device at a predetermined rate of deceleration for decreasing the braking effect of the braking means to decrease the rate of deceleration of the car, means responsive to operation of the centrifugal device at a predetermined speed for reducing the braking effect of the braking means when the speed of the car falls below a predetermined speed, and means responsive to operation of the switching means in operating the car for rendering the inertia device and the centrifugal device effective only during deceleration of the car.

4. In an elevator control system for a car serving a floor landing, a hoisting motor for the car, switching apparatus, means responsive to one operation of the switching apparatus for causing the motor to move the car upwardly responsive to another operation of the switching apparatus for causing the motor to move the car downwardly and responsive to another operation of the switching apparatus for decelerating and stopping the car, braking means, means responsive to operation of the switching apparatus to decelerate the car for applying the braking means to assist in decelerating the car, a decelerating controller including a centrifugal device provided with a switch disposed to be operated by operation of the centrifugal device at a predetermined speed, an inertia device provided with an "up" switch and a "down" switch disposed to be operated by operation of the inertia device at a predetermined rate of deceleration, means for rotating the controller in accordance with the speed and direction of operation of the car, means responsive to operation of the switch on the centrifugal device for reducing the braking effect of the braking means when the car falls below a predetermined speed, means responsive to operation of the up switch when the car is moving upwardly and responsive to operation of the down switch when the car is moving downwardly for decreasing the braking effect of the braking means to decrease the rate of deceleration of the car, and means responsive to operation of the switching means to decelerate the car for rendering effective the switch on the centrifugal device and either the "up" or the "down" switch on the inertia device in accordance with the direction of operation of the car only during deceleration of the car.

5. In an elevator system for operating a car serving a floor, motive means for the car, means for controlling the motive means to operate the car, an electromagnetic brake for controlling the deceleration and stopping of the car, a circuit for said electromagnetic brake, an inertia bar, a switch for each end of the inertia bar for connection in said circuit, means responsive to operation of the control means for up direction operation for connecting the switch on one end of the inertia bar for up operation in said circuit and responsive to operation of the control means for down direction operation for connecting the switch on the other end of the inertia bar for down operation in said circuit, and means responsive to a predetermined rate of deceleration of the car for operating said inertia bar to close the switch corresponding to the direction of operation of the car to effect operation of the brake to decrease the rate of deceleration of the car.

6. In an elevator system for operating a car serving a floor, motive means for the car, a control means, means responsive to one operation of the control means for starting and operating the motive means to move the car, means responsive to another operation of the control means for decelerating the car to make a stop, an electromagnetic brake for assisting in decelerating and stopping the car, a main circuit for the brake, a decelerating control means comprising an auxiliary circuit for the brake, means responsive to operation of the decelerating means for controlling said main circuit to effect application of the brake to retard the car, an inertia device responsive to a predetermined rate of deceleration of the car for reducing the braking effect of the brake to decrease the rate of deceleration of the car, a centrifugal switch responsive to a predetermined speed of the car for controlling said auxiliary circuit to reduce the braking effect of the brake when the car falls below said predetermined speed, and means responsive to operation of the car during its deceleration for rendering the inertia device and the centrifugal device effective for controlling the brake during a predetermined first stage of deceleration of the car.

7. In an elevator system for operating a car serving a floor, motive means for the car, means for controlling the motive means to start and to decelerate the car, a brake, means for applying the brake for decelerating and stopping the car, a decelerating control means comprising a centrifugal device responsive to the speed of the car for effecting a release of the brake when the speed of the car falls below a predetermined speed and an inertia device responsive to a predetermined rate of deceleration of the car for effecting a release of the brake to decrease the rate of deceleration of the car, and means responsive to operation of the control means in decelerating the car for rendering the decelerating control means effective only during deceleration of the car.

8. In an elevator system for operating a car serving a floor, motive means for the car, control means for causing the motive means to start and to decelerate the car, an electromagnetic brake, a main circuit for the brake, a first auxiliary circuit and a second auxiliary circuit for controlling the brake, means responsive to operation of the control means to decelerate the car for rendering the main circuit ineffective and thereby effecting application of the brake to decelerate the car and preparing the first and second auxiliary circuits for controlling the brake during deceleration, a centrifugal device responsive to operation of the car at a predetermined speed during deceleration for controlling said first auxiliary circuit to reduce the braking effect of the brake when the car falls below said predetermined speed during deceleration, and an inertia device responsive to a predetermined rate of deceleration of the car for controlling said second auxiliary circuit to reduce the braking effect of the brake to decrease the rate of deceleration of the car.

9. In an elevator system for operating a car serving a floor, motive means for the car, control means for causing the motive means to start and to decelerate the car, an electromagnetic brake, a main circuit, a first auxiliary circuit and a second auxiliary circuit and a resistor circuit for the brake, means responsive to operation of the control means to decelerate the car for rendering the main circuit ineffective and thereby effecting application of the brake in decelerating the car and for preparing the first and second auxiliary circuits for controlling the brake during deceleration, a centrifugal switch responsive to operation of the car at a predetermined speed during deceleration for closing the said first auxiliary circuit to reduce the braking effect of the brake when the car falls below said predetermined speed during deceleration and an inertia switch responsive to a predetermined rate of deceleration of the car for closing said second auxiliary circuit to reduce the braking effect of the brake to decrease the rate of deceleration of the car, said resistor circuit being the only effective circuit for the brake during deceleration of the car except when the centrifugal switch or the inertia switch closes the first or the second auxiliary circuit.

10. In an elevator system for operating a car serving a floor, motive means for the car, control means for causing the motive means to start and to decelerate the car, an electromagnetic brake, a main circuit and a first auxiliary circuit and a second auxiliary circuit for controlling the brake, means responsive to operation of the control means to decelerate the car for rendering the main circuit ineffective and thereby effecting application of the brake to assist in decelerating the car and preparing the first and second auxiliary circuits for controlling the brake during deceleration, a centrifugal device responsive to operation of the car at a predetermined speed during deceleration for controlling said first auxiliary circuit to reduce the braking effect of the brake when the car falls below said predetermined speed during the first stages of deceleration, an inertia device responsive to a predetermined rate of deceleration of the car for controlling said second auxiliary circuit to reduce the braking effect of the brake for decreasing the rate of deceleration of the car during the first and second stages of deceleration, and means responsive to operation of the control means for rendering the centrifugal device effective only during the first stage of deceleration and for rendering the inertia device effective only during the first and second stages of deceleration.

11. In a control system for an elevator car, motive means for the car, control means, means responsive to one operation of the control means for operating the motive means to start the car, decelerating means responsive to another operation of the control means and to the approach of the car to a predetermined distance from the point at which a stop is to be made for initiating deceleration of the car for a stop, a brake for controlling deceleration of the car, an inertia switch responsive to a predetermined rate of deceleration of the car for controlling the brake to decrease the rate of deceleration when the car exceeds said predetermined rate of deceleration, a centrifugal device responsive to a predetermined rate of speed of said car during one stage of deceleration to reduce the braking effect of the brake to decrease the rate of deceleration of the car when it falls below said speed during said stage of deceleration, means responsive to operation of the decelerating means for rendering the centrifugal device effective only during the first stage of deceleration and for rendering the inertia device effective only during the first and second stages of deceleration, and a stopping device responsive to the approach of the car to a second predetermined distance from the point at which the stop is to be made for effecting application of the brake a predetermined time thereafter to stop the car, for decelerating the car at a predetermined rate and in a predetermined time from the point of initiation of deceleration to the point where the car stops and comes to rest.

12. In an elevator control system for a car serving a floor in a hatchway, a motor for operating the car, a car switch, an up direction relay responsive to "up" operation of the switch for connecting the motor to move the car upwardly, a down direction relay responsive to "down" operation of the switch for connecting the motor to move the car downwardly, an intermediate speed relay responsive to operation of either direction relay for effecting an increased speed of the motor, a high speed relay responsive to energization of the intermediate speed relay for effecting a higher speed of the motor, a decelerating relay responsive to a "stopping" operation of the switch and to a predetermined position of the car for deenergizing the speed relays to cause deceleration of the motor and the car, a brake, means responsive to operation of the decelerating relay for applying the brake to decelerate the car, a decelerating control means comprising an inertia device responsive to a predetermined rate of deceleration of the car for releasing the brake to decrease the rate of deceleration, a centrifugal device responsive to a predetermined speed of the car for releasing the brake when the car falls below said predetermined speed, a second decelerating relay responsive to operation of the first decelerating relay and a second predetermined position of the car for rendering the centrifugal device ineffective to control the brake during a second stage of deceleration of the car, and a stopping relay responsive to operation of said second decelerating relay and the expiration of a predetermined time thereafter for effecting operation of the brake to stop the car and for rendering the said decelerating control means ineffective to operate.

CLINTON R. HANNA.